US012671511B2

(12) United States Patent  (10) Patent No.: US 12,671,511 B2
Han  (45) Date of Patent: Jun. 30, 2026

(54) TIME SOURCE SIGNAL DETERMINATION METHOD AND APPARATUS, NETWORK DEVICE, AND STORAGE MEDIUM

(71) Applicants: China Mobile Communication Co., Ltd Research Institute, Beijing (CN); China Mobile Communications Group Co., Ltd., Beijing (CN)

(72) Inventor: Liuyan Han, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 289 days.

(21) Appl. No.: 18/566,191

(22) PCT Filed: Jun. 6, 2022

(86) PCT No.: PCT/CN2022/097053
§ 371 (c)(1),
(2) Date: Dec. 1, 2023

(87) PCT Pub. No.: WO2022/253348
PCT Pub. Date: Dec. 8, 2022

(65) Prior Publication Data
US 2024/0259125 A1 Aug. 1, 2024

(30) Foreign Application Priority Data
Jun. 3, 2021 (CN) .......................... 202110621328.5

(51) Int. Cl.
*H04J 3/06* (2006.01)
(52) U.S. Cl.
CPC .......... *H04J 3/0641* (2013.01); *H04J 3/0658* (2013.01)

(58) Field of Classification Search
CPC ...... H04J 3/0641; H04J 3/0658; H04J 3/0667; H04J 3/14; H04J 3/0638; H04W 56/0015
See application file for complete search history.

(56) References Cited

U.S. PATENT DOCUMENTS

2016/0073365 A1* 3/2016 Klockar ................ H04J 3/0667
370/503
2016/0182214 A1 6/2016 Chen
(Continued)

FOREIGN PATENT DOCUMENTS

CN 102739389 A 10/2012
CN 103873224 A 6/2014
(Continued)

OTHER PUBLICATIONS

Kirrmann et al., "Coexistence of IEEE 1588, C37.238 and 802.1AS, Issues and Recommendations", 2012 International IEEE Symposium on IEEE, Sep. 24, 2021.
(Continued)

*Primary Examiner* — Nizar N Sivji
(74) *Attorney, Agent, or Firm* — Price Heneveld LLP

(57) ABSTRACT

A time source signal determination method and apparatus, a network device, and a storage medium are provided. The method is performed by the network device, and includes: obtaining respective data sets of at least two time source signal, wherein the data sets include at least one type of information among following types of information corresponding to the time source signals: a grandmaster clock identifier, a grandmaster clock quality parameter, and path time accuracy; comparing the at least one type of information in the data sets of the at least two time source signals, and determining a better time source signal based on a result of the comparison.

18 Claims, 3 Drawing Sheets

(56)                    References Cited

U.S. PATENT DOCUMENTS

| | | | |
|---|---|---|---|
| 2018/0013508 A1 | 1/2018 | Rabinovich et al. |
| 2020/0403901 A1 | 12/2020 | Sugiyama et al. |
| 2021/0328696 A1 | 10/2021 | Lv et al. |
| 2021/0328698 A1 | 10/2021 | Lv et al. |
| 2022/0060310 A1 | 2/2022 | Arai et al. |

FOREIGN PATENT DOCUMENTS

| | | | |
|---|---|---|---|
| CN | 104426645 A | 3/2015 |
| CN | 107046449 A | 8/2017 |
| CN | 107181551 A | 9/2017 |
| CN | 109218007 A | 1/2019 |
| CN | 111385050 A | 7/2020 |
| CN | 111385051 A | 7/2020 |
| JP | 2010161708 A | 7/2010 |
| JP | 2015046708 A | 3/2015 |
| JP | 2016152489 A | 8/2016 |
| JP | 2016225677 A | 12/2016 |
| JP | 2017022645 A | 1/2017 |
| JP | 2019146052 A | 8/2019 |
| JP | 2019213014 A | 12/2019 |
| JP | 2020098974 A | 6/2020 |

OTHER PUBLICATIONS

"Precision time protocol telecom profile for phase/time synchronization with full timing support from the network", ITU-T, G.8275.1Y 1369.13GPP Draft; 3rd Generation Partnership Project (3GPP), Mobile Competence; France, Jul. 2014.

China Mobile Communications Corporation et al., "Use cases of enhanced BMCA", International Telecommunication Union, SG15-C1859, Telecommunication Standardization Sector, Study Group 15, Study Period 2017-2020, Geneva, Jan. 27-Feb. 7, 2020.

* cited by examiner

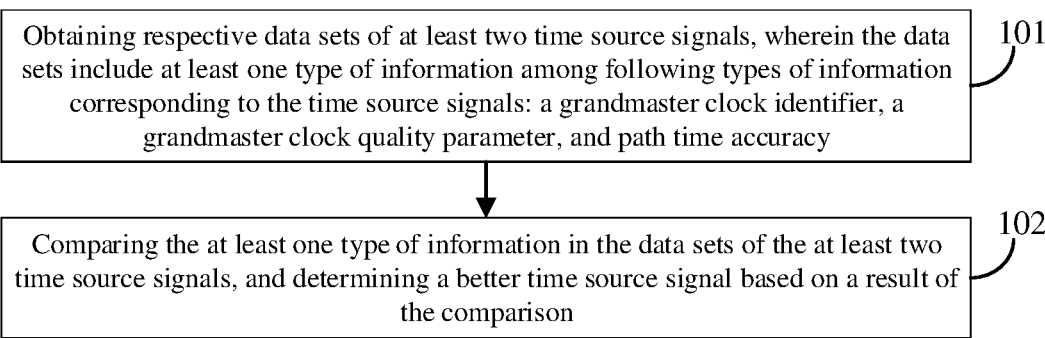

Obtaining respective data sets of at least two time source signals, wherein the data sets include at least one type of information among following types of information corresponding to the time source signals: a grandmaster clock identifier, a grandmaster clock quality parameter, and path time accuracy — 101

Comparing the at least one type of information in the data sets of the at least two time source signals, and determining a better time source signal based on a result of the comparison — 102

Fig. 1

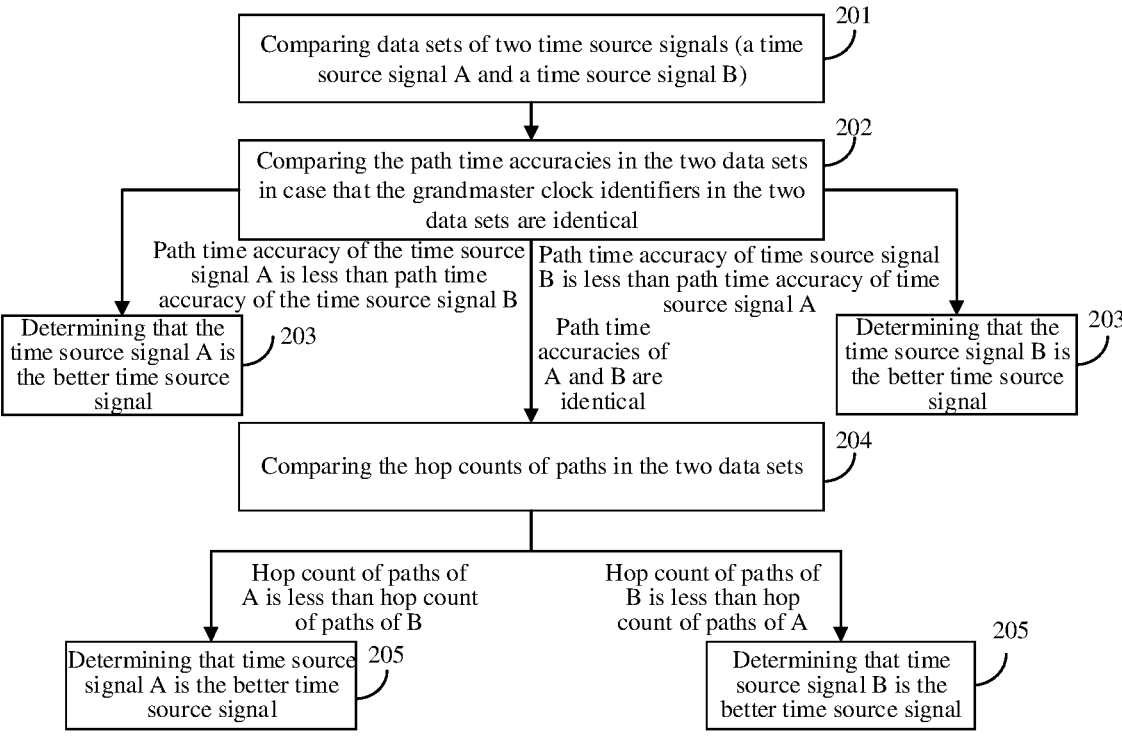

Comparing data sets of two time source signals (a time source signal A and a time source signal B) — 201

Comparing the path time accuracies in the two data sets in case that the grandmaster clock identifiers in the two data sets are identical — 202

Path time accuracy of the time source signal A is less than path time accuracy of the time source signal B Path time accuracy of time source signal B is less than path time accuracy of time source signal A Path time accuracies of A and B are identical Determining that the time source signal A is the better time source signal — 203

Determining that the time source signal B is the better time source signal — 203

Comparing the hop counts of paths in the two data sets — 204

Hop count of paths of A is less than hop count of paths of B

Hop count of paths of B is less than hop count of paths of A

Determining that time source signal A is the better time source signal — 205

Determining that time source signal B is the better time source signal — 205

Fig. 2

TIME SOURCE SIGNAL DETERMINATION METHOD AND APPARATUS, NETWORK DEVICE, AND STORAGE MEDIUM

CROSS-REFERENCE TO RELATED APPLICATION

The application is the U.S. national phase of PCT Application No. PCT/CN2022/097053 filed on Jun. 6, 2022, which claims priority to the Chinese patent application No. 202110621328.5 filed in China on Jun. 3, 2021, a disclosure of which is incorporated herein by reference in its entirety.

TECHNICAL FIELD

The present disclosure relates to the field of communications technology, in particular, relates to a time source signal determination method, a time source signal determination apparatus, a network device and a storage medium.

BACKGROUND

With the development of 5th Generation (5G) services and the elevation of some special industry demands, requirements on network time synchronization accuracy are increasing. In a time synchronization network, a synchronization source server usually provided upstream of the network outputs time signals, and the time signals are delivered via a transmission network to various nodes requiring synchronization. When a node obtains time source signals from various time sources, the node needs to select an optimal time source signal through comparison.

Conventionally, the comparison is mainly based on information such as a hop count, a time source signal having the minimum hop count is considered optimal. However, this approach is based on a single factor. Under some circumstances, the time source signal having the minimum hop count is not necessarily the best choice.

SUMMARY

Embodiments of the present disclosure provide a time source signal determination method, a time source signal determination apparatus, a network device and a storage medium.

The technical solutions of the embodiments of the present disclosure are implemented as follows.

An embodiment of the present disclosure provides a time source signal determination method. The time source signal determination method is performed by a network device and includes:

obtaining respective data sets of at least two time source signals, wherein the data sets include at least one type of information among following types of information corresponding to the time source signals: grandmaster clock identifier, grandmaster clock quality parameter, and path time accuracy; and, comparing the at least one type of information in the data sets of the at least two time source signals, and determining a better time source signal based on a result of the comparison.

In some optional embodiments of the present disclosure, the comparing the at least one type of information in the data sets of the at least two time source signals, and determining the better time source signal based on the result of the comparison includes:

comparing the grandmaster clock identifiers in the data sets of the at least two time source signals;

comparing the path time accuracies in the data sets of the at least two time source signals in case that the grandmaster clock identifiers are identical; and determining a time source signal having a less value of the path time accuracy as the better time source signal.

In some optional embodiments of the present disclosure, the data sets further include hop counts of paths; and the comparing the at least one type of information in the data sets of the at least two time source signals, and determining the better time source signal based on the result of the comparison includes:

comparing the grandmaster clock identifiers in the data sets of the at least two time source signals;

comparing the path time accuracies in the data sets of the at least two time source signals in case that the grandmaster clock identifiers are identical;

comparing the hop counts of paths in the data sets of the at least two time source signals in case that the path time accuracies are identical; and determining a time source signal having a less hop count of paths as the better time source signal.

In some optional embodiments of the present disclosure, the comparing the at least one type of information in the data sets of the at least two time source signals, and determining the better time source signal based on the result of the comparison includes:

comparing the grandmaster clock quality parameters in the data sets of the at least two time source signals; and determining a time source signal, which has a better clock quality characterized by the grandmaster clock quality parameter, and for which a grandmaster clock is usable, as the better time source signal.

In some optional embodiments of the present disclosure, the comparing the at least one type of information in the data sets of the at least two time source signals, and determining the better time source signal based on the result of the comparison includes:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable; and determining a time source signal having a less value of the path time accuracy as the better time source signal.

In some optional embodiments of the present disclosure, the data sets further include hop counts of paths; and the comparing the at least one type of information in the data sets of the at least two time source signals, and determining the better time source signal based on the result of the comparison includes:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable;

comparing the hop counts of paths in the data sets of the at least two time source signals in case that the path time accuracies are identical; and determining a time source signal having a less hop count of paths as the better time source signal.

In some optional embodiments of the present disclosure, the obtaining the respective data sets of the at least two time source signals includes:

receiving, by the network device, at least two synchronization messages, wherein each of the synchronization messages includes information of one time source signal; and obtaining, based on the information of the time source signals, the data sets corresponding to the time source signals.

In some optional embodiments of the present disclosure, the data sets further include hop counts of paths;

in case that one of two synchronization messages includes information related to the path time accuracy and the other one synchronization message of the two synchronization messages does not include information related to the path time accuracy, the path time accuracy corresponding to the other one synchronization message is obtained through calculation based on the hop count of the path.

In some optional embodiments of the present disclosure, the path time accuracy corresponding to the other one synchronization message is calculated through multiplying the hop count of the path by a preset node accuracy.

In some optional embodiments of the present disclosure, the grandmaster clock quality parameter includes at least one of following parameters:

clock class, time accuracy, stability, priority.

In some optional embodiments of the present disclosure, the time accuracy of the grandmaster clock is a static value or a transient value.

In some optional embodiments of the present disclosure, the path time accuracy includes one of following:

static time inaccuracy;

the static time inaccuracy and dynamic time inaccuracy;

the static time inaccuracy, the dynamic time inaccuracy and transient time inaccuracy;

maximum time inaccuracy.

An embodiment of the present disclosure further provides a time source signal determination apparatus including an obtaining unit and a determining unit, wherein, the obtaining unit is configured to obtain respective data sets of at least two time source signals, wherein the data sets include at least one type of information among following types of information corresponding to the time source signals: grandmaster clock identifier, grandmaster clock quality parameter, and path time accuracy; and, the determining unit is configured to compare the at least one type of information in the data sets of the at least two time source signals, and determine a better time source signal based on a result of the comparison.

An embodiment of the present disclosure further provides a computer readable storage medium storing a computer program, wherein the computer program is configured to be executed by a processor to implement the steps of the time source signal determination method according to the embodiments of the present disclosure.

An embodiment of the present disclosure further provides a network device, including a memory, a processor and a computer program stored in the memory and executable by the processor, wherein the processor is configured to execute the computer program to implement the steps of the time source signal determination method according to the embodiments of the present disclosure.

According to the time source signal determination method and apparatus, the network device and the storage medium provided in the embodiments of the present disclosure, the network device obtains respective data sets of at least two time source signals, wherein the data sets include at least one type of information among following types of information corresponding to the time source signals: grandmaster clock identifier, grandmaster clock quality parameter, and path time accuracy, and compares the at least one type of information in the data sets of the at least two time source signals, and determines a better time source signal based on a result of the comparison. In the technical solution of the embodiments of the present disclosure, a better time source signal (or a better time source signal) is determined on the basis of at least one type of information among grandmaster clock identifiers, grandmaster clock quality parameters, and path time accuracy, thus the better time source signal (or the better time source signal) is determined in a more reasonable manner, thereby better meeting the requirements of time synchronization.

BRIEF DESCRIPTION OF THE DRAWINGS

FIG. 1 is a flow diagram of a time source signal determination method according to an embodiment of the present disclosure;

FIG. 2 is another flow diagram of a time source signal determination method according to an embodiment of the present disclosure;

DETAILED DESCRIPTION

Figure 3:
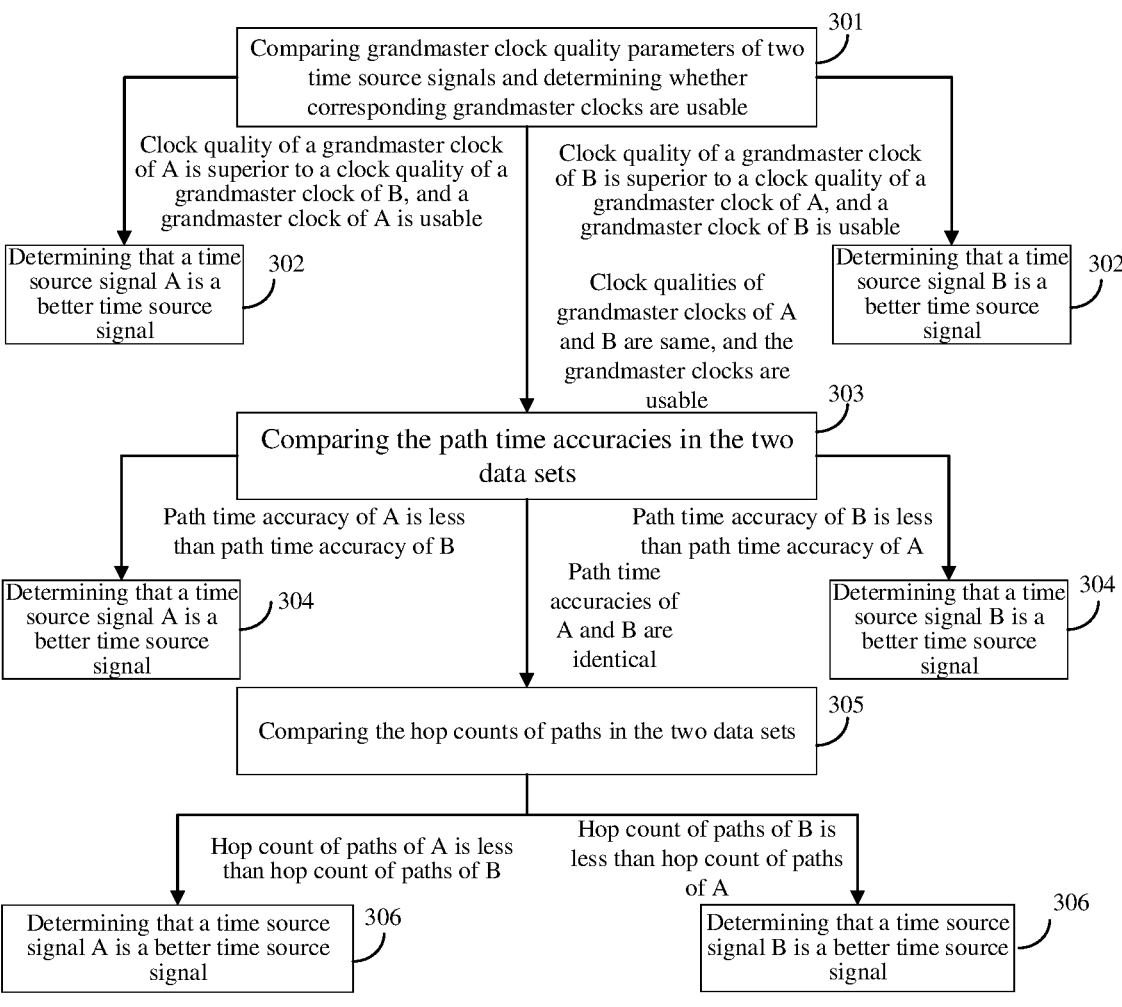
FIG. 3 is yet another flow diagram of a time source signal determination method according to an embodiment of the present disclosure.

The present disclosure is described in further details below with reference to accompany drawings and specific embodiments.

An embodiment of the present disclosure provides a time source signal determination method. FIG. 1 is a flow diagram of the time source signal determination method according to the embodiment of the present disclosure. As shown in FIG. 1, the method includes:

a step 101: obtaining respective data sets of at least two time source signals, wherein the data sets include at least one type of information among following types of information corresponding to the time source signals: a grandmaster clock identifier, a grandmaster clock quality parameter, and a path time accuracy; and, a step 102: comparing the at least one type of information in the data sets of the at least two time source signals, and determining a better time source signal based on a result of the comparison.

The time source signal determination method according to the embodiment is performed by a network device. The network device may be any network node in need of time synchronization. For example, the network device may be a base station, or other network device. The exact type of the network device is not limited herein.

In some optional embodiments of the present disclosure, the step 101, i.e. the obtaining respective data sets of at least two time source signals, includes: receiving, by the network device, at least two synchronization messages, wherein each of the synchronization messages includes information of one time source signal; and obtaining, based on the information of the time source signals, the data sets corresponding to the time source signals.

In the embodiment, each time source signal corresponds to one synchronization message, each synchronization message carries information of a corresponding time source signal, and the network device obtains, based on information of various time source signals, data sets of corresponding time source signals. In some implementations, the synchronization message may directly carry information of the data set, e.g., the synchronization message may directly carry a grandmaster clock identifier. In some other implementations, the information of the data set needs to be obtained through calculation based on the information carried by the synchronization message. For example, the path time accuracy is obtained by summing static time inaccuracy and dynamic time inaccuracy.

In some optional embodiments, the data sets further include hop counts of paths; in case that one of two synchronization messages includes information related to the path time accuracy and the other of the two synchronization messages does not include information related to the path time accuracy, the path time accuracy corresponding to the other synchronization message is calculated based on the hop count of the path.

In the embodiment, the synchronization message may further include the hop count of paths. The hop count of paths may represent a quantity of nodes passed by the synchronization message during the course from an initial node to the network device. In this case, if one of two synchronization messages includes information related to the path time accuracy, i.e. the network device can determine the path time accuracy based on information related to the path time accuracy, and the other of the two synchronization messages does not include information related to the path time accuracy, i.e. the network device cannot determine the corresponding path time accuracy, then in order to make comparison of information such as path time accuracies, the network device may determine, based on other information, the path time accuracy corresponding to the other synchronization message; in specific, the network device may calculate the path time accuracy corresponding to the other synchronization message on the basis of the hop count of paths corresponding to the other synchronization message.

Optionally, the path time accuracy corresponding to the other synchronization message is calculated through multiplying the hop count of the path by a preset node accuracy. In this way, during comparing the information in the data sets, comparison of the path time accuracies may be performed.

In some optional embodiments of the present disclosure, the grandmaster clock quality parameter includes at least one of following parameters: clock class (clockClass), time accuracy (Accuracy), stability (offsetScaledLog Variance), priority (Priority).

In some optional embodiments, the time accuracy of the grandmaster clock is a static value or a transient value. As an example, the network device may obtain in advance a static value that corresponds to a time source signal and represents a time accuracy; wherein static values corresponding to different time source signals may be identical or different from each other. As another example, the synchronization message may include information (e.g., a static value or transient value) related to the time accuracy of the grandmaster clock, in this case, the network device may determine, from the received synchronization message, the time accuracy (e.g., the static value or transient value) of the grandmaster clock corresponding to the time source signal.

In some optional embodiments, the path time accuracy includes one of following:

static time inaccuracy;

the static time inaccuracy and dynamic time inaccuracy;

the static time inaccuracy, the dynamic time inaccuracy and transient time inaccuracy;

maximum time inaccuracy.

In the embodiment, the path time accuracy may be obtained in different approaches. In an implementation, the path time accuracy is represented by static time inaccuracy. For example, different time source signals (or different grandmaster clocks) may correspond to different respective static time inaccuracy, and the synchronization message may carry the grandmaster clock identifier and the static time inaccuracy; in this case, after receiving the synchronization message, the network device may obtain the grandmaster clock identifier and the corresponding static time inaccuracy from the synchronization message, and determine the corresponding path time accuracy on the basis of the static time inaccuracy. In another embodiment, different time source signals (or different grandmaster clocks) may correspond to identical static time inaccuracy or different respective static time inaccuracy, and the different time source signals (or different grandmaster clocks) may correspond to identical dynamic time inaccuracy or different respective dynamic time inaccuracy; the synchronization message may carry a grandmaster clock identifier, the static time inaccuracy and the dynamic time inaccuracy; in this case, after receiving the synchronization message, the network device may obtain the grandmaster clock identifier, the corresponding static time inaccuracy and dynamic time inaccuracy from the synchronization message, and calculate the path time accuracy on the basis of the static time inaccuracy and the dynamic time inaccuracy corresponding to a time source signal, e.g., summing the static time inaccuracy and the dynamic time inaccuracy. In yet another embodiment, similar to the aforementioned embodiment, the network device may obtain the grandmaster clock identifier, the corresponding static time inaccuracy, the dynamic time inaccuracy and the transient time inaccuracy from the synchronization message, and calculate the path time accuracy on the basis of the static time inaccuracy, dynamic time inaccuracy and transient time inaccuracy corresponding to a time source signal, e.g., summing the static time inaccuracy, the dynamic time inaccuracy and the transient time inaccuracy. In still another embodiment, the network device may receive multiple synchronization messages corresponding to the same time source signal within a time frame, wherein each of the synchronization messages may include time inaccuracy, and the network device may determine maximum time inaccuracy among the multiple pieces of time inaccuracy, and determine a corresponding path time accuracy based on the maximum time inaccuracy. Optionally, the network device may obtain the grandmaster clock identifier and corresponding maximum time inaccuracy from the synchronization message, and determine a corresponding path time accuracy on the basis of the maximum time inaccuracy. The static time inaccuracy, the dynamic time inaccuracy, the transient time inaccuracy and the maximum time inaccuracy are all determined and added by a node other than the network device into the synchronization message during the transmission of the time source signal.

In the technical solutions of the embodiments of the present disclosure, the network device determines a better time source signal (or a better time source signal) on the basis of at least one type of information among the grandmaster clock identifier, the grandmaster clock quality parameter, and the path time accuracy, thus the better time source signal (or the better time source signal) is determined in a more reasonable manner, thereby better meeting the requirements of time synchronization.

As an implementation of the step 102, the comparing the at least one type of information in the data sets of the at least two time source signals, and determining the better time source signal based on the result of the comparison includes: comparing the grandmaster clock identifiers in the data sets of the at least two time source signals; comparing the path time accuracies in the data sets of the at least two time source signals in case that the grandmaster clock identifiers are identical; and determining a time source signal having a less value of the path time accuracy as the better time source signal.

In the embodiment, the network device compares the grandmaster clock identifiers in the data sets of the at least two time source signals; if the grandmaster clock identifiers are identical, then it means that the time source signals originate from the same grandmaster clock, the network device further compares the path time accuracies and determines a time source signal having a less value of the path time accuracy as the better time source signal.

As an implementation of the step 102, the data sets further include hop counts of paths; and the comparing the at least one type of information in the data sets of the at least two time source signals, and determining the better time source signal based on the result of the comparison includes: comparing the grandmaster clock identifiers in the data sets of the at least two time source signals; comparing the path time accuracies in the data sets of the at least two time source signals in case that the grandmaster clock identifiers are identical; comparing the hop counts of paths in the data sets of the at least two time source signals in case that the path time accuracies are identical; and determining a time source signal having a less hop count of paths as the better time source signal.

As an implementation of the step 102, the comparing the at least one type of information in the data sets of the at least two time source signals, and determining the better time source signal based on the result of the comparison includes: comparing the grandmaster clock quality parameters in the data sets of the at least two time source signals; and determining a time source signal, which has a better clock quality characterized by the grandmaster clock quality parameter and for which the grandmaster clock is usable, as the better time source signal.

In the embodiment, the grandmaster clock quality parameter includes at least one of following parameters: clock class, time accuracy, stability, priority, and the network device may determine the quality of the corresponding grandmaster clock on the basis of at least one of the aforementioned parameters. In some examples, the priority of each of the parameters may be configured in advance, for example, a priority of the clock class is higher than a priority of the time accuracy, the priority of the time accuracy is higher than a priority of the stability, and is higher than a priority of the stability, and is higher than the priority. In this case, the network device may first compare the clock classes, and if the clock class corresponding to one time source signal is higher than the clock class corresponding to another time source signal, then it may be determined that the quality of the clock characterized by the one time source signal is better. In some other example, the weight coefficient of each of the parameters may be configured in advance, and a weighted sum of the aforementioned parameters is calculated on the basis of the weight coefficients, and the clock quality is determined on the basis of the result of calculating the weighted sum.

The grandmaster clock being usable refers to that the clock class corresponding to the grandmaster clock is within a usable range of the network device.

As an implementation of the step 102, the comparing the at least one type of information in the data sets of the at least two time source signals, and determining the better time source signal based on the result of the comparison includes: comparing the grandmaster clock quality parameters in the data sets of the at least two time source signals; comparing the path time accuracies in the data sets of the at least two time source signals in case that clock qualities characterized by the grandmaster clock quality parameters are identical and grandmaster clocks corresponding to the at least two time source signals are all usable; and determining a time source signal having a less value of the path time accuracy as the better time source signal.

As an implementation of the step 102, the data sets further include hop counts of paths; and the comparing the at least one type of information in the data sets of the at least two time source signals, and determining the better time source signal based on the result of the comparison includes: comparing the grandmaster clock quality parameters in the data sets of the at least two time source signals; comparing the path time accuracies in the data sets of the at least two time source signals in case that clock qualities characterized by the grandmaster clock quality parameters are identical and grandmaster clocks corresponding to the at least two time source signals are all usable; comparing the hop counts of paths in the data sets of the at least two time source signals in case that the path time accuracies are identical; and determining a time source signal having a less hop count of paths as the better time source signal.

The time source signal determination method according to embodiments of the present disclosure is illustrated below with reference to specific examples.

Example 1

FIG. 2 is another flow diagram of a time source signal determination method according to an embodiment of the present disclosure. In this example, the data sets may include: a grandmaster clock identifier, a path time accuracy and a hop count of paths. As shown in FIG. 2, the method includes step 201 to step 205.

Step 201: comparing data sets of two time source signals; assuming the two time source signals are a time source signal A and a time source signal B, respectively.

Step 202: comparing the path time accuracies in the two data sets in case that the grandmaster clock identifiers in the two data sets are identical.

Step 203: determining that the time source signal A is the better time source signal in case that the path time accuracy corresponding to the time source signal A is less than the path time accuracy corresponding to the time source signal B; and determining that the time source signal B is the better time source signal in case that the path time accuracy corresponding to the time source signal B is less than the path time accuracy corresponding to the time source signal A.

Step 204: comparing the hop counts of paths in the two data sets in case that the two path time accuracies are identical.

Step 205: determining that the time source signal A is the better time source signal in case that the hop count of paths corresponding to the time source signal A is less than the hop count of paths corresponding to the time source signal B; and determining that the time source signal B is the better time source signal in case that the hop count of paths corresponding to the time source signal B is less than the hop count of paths corresponding to the time source signal A.

Example 2

FIG. 3 is yet another flow diagram of a time source signal determination method according to an embodiment of the present disclosure. In this example, the data sets may include: a grandmaster clock quality parameter, a path time accuracy and a hop count of paths. As shown in FIG. 3, the method includes step 301 to step 306.

Step 301: comparing grandmaster clock quality parameters of two time source signals and determining whether corresponding grandmaster clocks are usable; assuming the two time source signals are a time source signal A and a time source signal B, respectively.

Step 302: determining that the time source signal A is the better time source signal in case that the clock quality of the grandmaster clock corresponding to the time source signal A is superior to the clock quality of the grandmaster clock corresponding to the time source signal B, and the grandmaster clock corresponding to the time source signal A is usable; and determining that the time source signal B is the better time source signal in case that the clock quality of the grandmaster clock corresponding to the time source signal B is superior to the clock quality of the grandmaster clock corresponding to the time source signal A, and the grandmaster clock corresponding to the time source signal B is usable.

Step 303: comparing the path time accuracies in the two data sets in case that the grandmaster clock qualities characterized by the grandmaster clock quality parameters in the two data sets are identical and both the grandmaster clocks corresponding to the two time source signals are usable.

Step 304: determining that the time source signal A is the better time source signal in case that the path time accuracy corresponding to the time source signal A is less than the path time accuracy corresponding to the time source signal B; and determining that the time source signal B is the better time source signal in case that the path time accuracy corresponding to the time source signal B is less than the path time accuracy corresponding to the time source signal A.

Step 305: comparing the hop counts of paths in the two data sets in case that the two path time accuracies are identical.

Step 306: determining that the time source signal A is the better time source signal in case that the hop count of paths corresponding to the time source signal A is less than the hop count of paths corresponding to the time source signal B; and determining that the time source signal B is the better time source signal in case that the hop count of paths corresponding to the time source signal B is less than the hop count of paths corresponding to the time source signal A.

Figure 4:
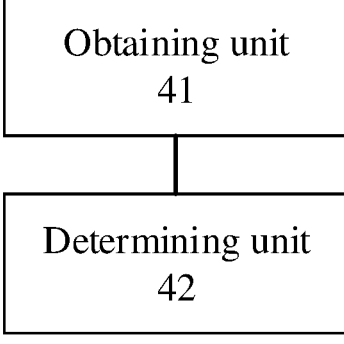
FIG. 4 is a schematic structure diagram of a time source signal determination apparatus according to an embodiment of the present disclosure.

An embodiment of the present disclosure further provides a time source signal determination apparatus. FIG. 4 is a schematic structure diagram of the time source signal determination apparatus according to an embodiment of the present disclosure. As shown in FIG. 4, the apparatus includes: an obtaining unit 41 and a determining unit 42, wherein, the obtaining unit 41 is configured to obtain respective data sets of at least two time source signals, wherein the data sets include at least one type of information among following types of information corresponding to the time source signals: a grandmaster clock identifier, a grandmaster clock quality parameter, and a path time accuracy; and, the determining unit 42 is configured to compare the at least one type of information in the data sets of the at least two time source signals, and determine a better time source signal based on a result of the comparison.

In some optional embodiments of the present disclosure, the determining unit 42 is configured to compare the grandmaster clock identifiers in the data sets of the at least two time source signals; compare the path time accuracies in the data sets of the at least two time source signals in case that the grandmaster clock identifiers are identical; and determine a time source signal having a less value of the path time accuracy as the better time source signal.

In some optional embodiments of the present disclosure, the data sets further include hop counts of paths; and the determining unit 42 is configured to compare the grandmaster clock identifiers in the data sets of the at least two time source signals; compare the path time accuracies in the data sets of the at least two time source signals in case that the grandmaster clock identifiers are identical; compare the hop counts of paths in the data sets of the at least two time source signals in case that the path time accuracies are identical; and determine a time source signal having a less hop count of paths as the better time source signal.

In some optional embodiments of the present disclosure, the determining unit 42 is configured to compare the grandmaster clock quality parameters in the data sets of the at least two time source signals; and determine a time source signal, which has a better clock quality characterized by the grandmaster clock quality parameter, and for which a grandmaster clock is usable, as the better time source signal.

In some optional embodiments of the present disclosure, the determining unit 42 is configured to compare the grandmaster clock quality parameters in the data sets of the at least two time source signals; compare the path time accuracies in the data sets of the at least two time source signals in case that clock qualities characterized by the grandmaster clock quality parameters are identical and grandmaster clocks corresponding to the at least two time source signals are all usable; and determine a time source signal having a less value of the path time accuracy as the better time source signal.

In some optional embodiments of the present disclosure, the data sets further include hop counts of paths; and the determining unit 42 is configured to compare the grandmaster clock quality parameters in the data sets of the at least two time source signals; compare the path time accuracies in the data sets of the at least two time source signals in case that clock qualities characterized by the grandmaster clock quality parameters are identical and grandmaster clocks corresponding to the at least two time source signals are all usable; compare the hop counts of paths in the data sets of the at least two time source signals in case that the path time accuracies are identical; and determine a time source signal having a less hop count of paths as the better time source signal.

In some optional embodiments of the present disclosure, the obtaining unit 41 is configured to receive at least two synchronization messages, wherein each of the synchronization messages includes information of one time source signal; and obtain, based on the information of the time source signals, the data sets corresponding to the time source signals.

In some optional embodiments of the present disclosure, the data sets further include hop counts of paths;

in case that one of two synchronization messages includes information related to the path time accuracy and the other of the two synchronization messages does not include information related to the path time accuracy, the path time accuracy corresponding to the other synchronization message is calculated based on the hop count of the path.

In some optional embodiments of the present disclosure, the path time accuracy corresponding to the other synchronization message is calculated through multiplying the hop count of the path by a preset node accuracy.

In some optional embodiments of the present disclosure, the grandmaster clock quality parameter includes at least one of following parameters: clock class, time accuracy, stability, priority.

In some optional embodiments of the present disclosure, the time accuracy of the grandmaster clock is a static value or a transient value.

In some optional embodiments of the present disclosure, the path time accuracy includes one of following:

static time inaccuracy;

the static time inaccuracy and dynamic time inaccuracy;

the static time inaccuracy, the dynamic time inaccuracy and transient time inaccuracy;

maximum time inaccuracy.

In embodiments of the present disclosure, the apparatus is applied in a network device. The obtaining unit 41 and the determining unit 42 in the apparatus may be implemented by a Central Processing Unit (CPU), a Digital Signal Processor (DSP), a Microcontroller Unit (MCU) or a Field-Programmable Gate Array (FPGA) in practical applications.

It is noted, the time source signal determination performed by the time source signal determination apparatus according to the foregoing embodiments is merely illustrated exemplarily by means of a division of the aforementioned program modules. In practical applications, the foregoing processes may be allocated to different program modules for execution as needed, that is, the internal structure of the apparatus may be divided into different program modules, to implement all or some of the aforementioned processes. In addition, the time source signal determination apparatus according to the embodiment and the embodiments of the time source signal determination method share the same inventive concept, thus for a specific implementation of the time source signal determination apparatus, reference may be made to the method embodiments, and a detailed description thereof is omitted herein.

Figure 5:
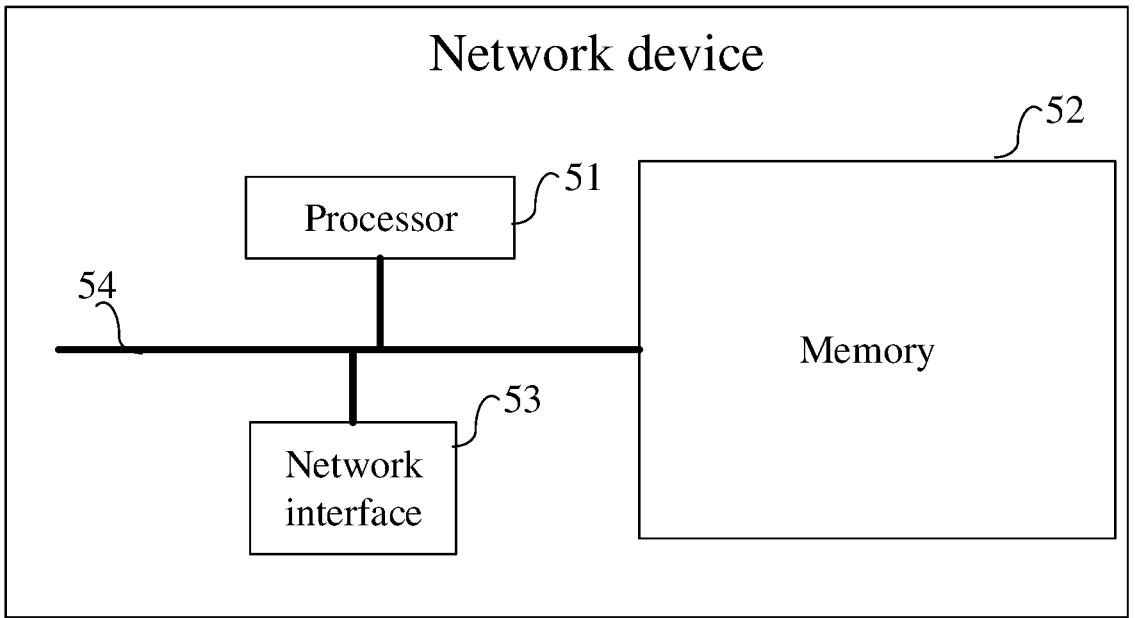
FIG. 5 is a schematic hardware structure diagram of a network device according to an embodiment of the present disclosure.

An embodiment of the present disclosure further provides a network device. FIG. 5 is a schematic hardware structure diagram of the network device according to an embodiment of the present disclosure. As shown in FIG. 5, the network device includes a memory 52, a processor 51 and a computer program stored in the memory 52 and executable by the processor 51, wherein the processor 51 is configured to execute the computer program to implement the steps of the time source signal determination method according to the embodiments of the present disclosure.

Optionally, the network device may further include one or more network interfaces 53. It is understood, the various components in the network device are coupled together by a bus system 54. It may be understood that the bus system 54 is configured to implement connection and communication among these components. The bus system 54 further includes a power bus, a control bus, and a status signal bus in addition to a data bus. However, for clarity of description, various buses in FIG. 5 are all labeled as the bus system 54.

It may be understood that the memory 52 may be a volatile memory or a nonvolatile memory, or may include both a volatile memory and a nonvolatile memory. The nonvolatile memory may be a Read-Only Memory (ROM), a Programmable ROM (PROM), an Erasable Programmable ROM (EPROM), an Electrically EPROM (EEPROM), a ferromagnetic random access memory (FRAM), a Flash Memory, a magnetic surface storage, an optic disc, or a Compact Disc Read-Only Memory (CD-ROM). The magnetic surface storage may be a magnetic disk storage or a magnetic tape storage. The volatile memory may be a random access memory (RAM), which is used as an external cache. By way of example rather than limitation, many forms of RAMs such as a static RAM (SRAM), a Synchronous Static Random Access Memory (SSRAM), a Dynamic RAM (DRAM), a Synchronous DRAM (SDRAM), a Double Data Rate SDRAM (DDRSDRAM), an Enhanced SDRAM (ESDRAM), a SyncLink DRAM (SLDRAM), and a Direct Rambus RAM (DRRAM) may be used. The memory 52 described in embodiments of the present disclosure is intended to include, but is not limited to, these and any other appropriate types of memories.

The foregoing method disclosed in the embodiments of the present disclosure may be applied to the processor 51 or implemented by the processor 51. The processor 51 may be an integrated circuit chip having a signal processing capability. During implementation, the steps in the foregoing method may be accomplished by hardware integrated logic circuits in the processor 51 or instructions in a software form. The processor 51 may be a general-purpose processor, a digital signal processor (DSP), or other programmable logic device, a discrete gate or a transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to the embodiments of the present disclosure may be directly performed and accomplished by a hardware decoding processor, or performed and accomplished by a combination of hardware and software modules in a decoding processor. The software modules may reside in a storage medium. The storage medium is located in the storage 52. The processor 51 reads information from the storage 52 and accomplishes the steps in the foregoing method using hardware of the processor 51.

In exemplary embodiments, the network device may be implemented by one or more Application Specific Integrated Circuits (ASICs), DSPs, Programmable Logic Devices (PLDs), Complex Programmable Logic Devices (CPLDs), FPGAs, general purpose processors, controllers, MCUs, microprocessors, or other electronic elements, to accomplish the aforementioned method.

In an exemplary embodiment, the present disclosure further provides a computer readable storage medium, e.g., the memory 52 including a computer program. The computer program may be executed by the processor 51 of the network device to implement the steps of the aforementioned method. The computer readable storage medium may be a storage such as FRAM, ROM, PROM, EPROM, EEPROM, flash memory, magnetic surface storage, optic disc or CD-ROM, or may be a variety of devices including one of or any combination of the above storages.

The computer readable storage medium according to the embodiment of the present disclosure stores a computer program. When executed by a processor, the computer program causes the processor to implement the steps of the method according to the embodiments of the present disclosure.

The methods disclosed in the method embodiments of the present disclosure may be combined arbitrarily to obtain a new method embodiment when no conflict is incurred.

The features disclosed in the product embodiments of the present disclosure may be combined arbitrarily to obtain a new product embodiment when no conflict is incurred.

The features disclosed in the method or device embodiments of the present disclosure may be combined arbitrarily to obtain a new method or device embodiment when no conflict is incurred.

It should be appreciated that the method and the device disclosed in the embodiments provided by the present disclosure may be implemented by other means. For example, the aforementioned device embodiments are merely illustrative, e.g., a partition of units is merely a logic functional partition, and other partitions may be implemented in practice, such as multiple units or components may be combined or integrated into another system, or some features may be ignored or not performed. Furthermore, the shown or discussed mutual coupling or direct coupling or communication connection can be achieved by indirect coupling or communication connection between some interfaces, devices or units in electric, mechanical or other ways.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented by hardware, or may be implemented by hardware plus software functional unit.

It is understood by a person of ordinary skill in the art that all or some of the steps of the aforementioned method embodiments may be implemented through hardware related to program instructions. The programs may be stored in a computer readable storage medium. The programs, when being executed, may include the steps of the embodiments of the aforementioned methods. Wherein the storage medium includes a variety of media capable of storing program codes, such as a removable storage device, a ROM, a RAM, a magnetic disk, or an optic disc.

Optionally, if the integrated units are implemented in a form of a software functional unit and sold or used as an independent product, the units may be stored in a computer-readable storage medium. Based on such an understanding, essential parts, or parts contributing to the related art, of the technical solution of the present disclosure may be implemented in form of a software product. The computer software product is stored in a storage medium, and includes several instructions for instructing a computer device (which may be a personal computer, a server, or a network device) to perform all or some of the steps of the methods described in the embodiments of the disclosure. The foregoing storage medium includes any medium that can store program codes, such as a removable storage device, an ROM, an RAM, a magnetic disk, or an optical disc.

The aforementioned are merely specific implementations of the present disclosure, but the protection scope of the disclosure is by no means limited thereto. Any modifications or replacements that would easily occur to those skilled in the art, without departing from the technical scope disclosed in the disclosure, should be encompassed in the protection scope of the present disclosure. Therefore, the protection scope of the present disclosure is to be determined by the scope of the claims.

What is claimed is:

1. A time source signal determination method, performed by a network device, comprising:

obtaining respective data sets of at least two time source signals, wherein each of the data sets comprises at least one type of information among following types of information corresponding to the at least two time source signals: a grandmaster clock identifier, a grandmaster clock quality parameter, and a path time accuracy; and, comparing the at least one type of information in the data sets of the at least two time source signals, and determining a better time source signal based on a result of the comparison;

wherein the data sets further comprise hop counts of paths; and the comparing the at least one type of information in the data sets of the at least two time source signals, and determining the better time source signal based on the result of the comparison comprises:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable;

comparing the hop counts of paths in the data sets of the at least two time source signals in case that the path time accuracies are identical; and determining a time source signal having a less hop count of paths as the better time source signal.

2. The time source signal determination method according to claim 1, wherein the comparing the at least one type of information in the data sets of the at least two time source signals, and determining the better time source signal based on the result of the comparison comprises:

comparing the grandmaster clock identifiers in the data sets of the at least two time source signals;

comparing the path time accuracies in the data sets of the at least two time source signals in case that the grandmaster clock identifiers are identical; and determining a time source signal having a less value of the path time accuracy as the better time source signal.

3. The time source signal determination method according to claim 1, wherein the data sets further comprise hop counts of paths; and the comparing the at least one type of information in the data sets of the at least two time source signals, and determining the better time source signal based on the result of the comparison comprises:

comparing the grandmaster clock identifiers in the data sets of the at least two time source signals;

comparing the path time accuracies in the data sets of the at least two time source signals in case that the grandmaster clock identifiers are identical;

comparing the hop counts of paths in the data sets of the at least two time source signals in case that the path time accuracies are identical; and determining a time source signal having a less hop count of paths as the better time source signal.

4. The time source signal determination method according to claim 1, wherein the comparing the at least one type of information in the data sets of the at least two time source signals, and determining the better time source signal based on the result of the comparison comprises:

comparing the grandmaster clock quality parameters in the data sets of the at least two time source signals; and determining a time source signal, which has a better clock quality characterized by the grandmaster clock quality parameter, and for which a grandmaster clock is usable, as the better time source signal.

5. The time source signal determination method according to claim 1, wherein the comparing the at least one type of information in the data sets of the at least two time source signals, and determining the better time source signal based on the result of the comparison comprises:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable; and determining a time source signal having a less value of the path time accuracy as the better time source signal.

6. The time source signal determination method according to claim 1, wherein the obtaining the respective data sets of the at least two time source signals comprises:

receiving at least two synchronization messages by the network device, wherein each of the synchronization messages comprises information of one time source signal; and obtaining the data sets corresponding to the time source signals based on the information of the time source signals.

7. The time source signal determination method according to claim 6, wherein the data sets further comprise hop counts of paths;

in case that one of two synchronization messages comprises information related to the path time accuracy and other one synchronization message of the two synchronization messages does not comprise information related to the path time accuracy, the path time accuracy corresponding to the other one synchronization message is obtained through calculation based on the hop count of the path.

8. The time source signal determination method according to claim 7, wherein the path time accuracy corresponding to the other one synchronization message is obtained through multiplying the hop count of the path by a preset node accuracy.

9. The time source signal determination method according to claim 1, wherein the grandmaster clock quality parameter comprises at least one of following parameters:

clock class, time accuracy, stability, priority.

10. The time source signal determination method according to claim 9, wherein the time accuracy of the grandmaster clock is a static value or a transient value.

11. The time source signal determination method according to claim 1, wherein the path time accuracy comprises one of following:

static time inaccuracy;

the static time inaccuracy and dynamic time inaccuracy;

the static time inaccuracy, the dynamic time inaccuracy and transient time inaccuracy;

maximum time inaccuracy.

12. A non-transitory computer readable storage medium storing a computer program, wherein the computer program is configured to be executed by a processor to implement a time source signal determination method, the method comprises:

obtaining respective data sets of at least two time source signals, wherein each of the data sets comprises at least one type of information among following types of information corresponding to the at least two time source signals: a grandmaster clock identifier, a grandmaster clock quality parameter, and a path time accuracy; and, comparing the at least one type of information in the data sets of the at least two time source signals, and determining a better time source signal based on a result of the comparison;

wherein the data sets further comprise hop counts of paths; and the comparing the at least one type of information in the data sets of the at least two time source signals, and determining the better time source signal based on the result of the comparison comprises:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable;

comparing the hop counts of paths in the data sets of the at least two time source signals in case that the path time accuracies are identical; and determining a time source signal having a less hop count of paths as the better time source signal.

13. A network device, comprising:

a memory, a processor and a computer program stored in the memory and executable by the processor, wherein the processor is configured to execute the computer program to implement a time source signal determination method, the method comprises:

obtaining respective data sets of at least two time source signals, wherein each of the data sets comprises at least one type of information among following types of information corresponding to the at least two time source signals: a grandmaster clock identifier, a grandmaster clock quality parameter, and a path time accuracy; and, comparing the at least one type of information in the data sets of the at least two time source signals, and determining a better time source signal based on a result of the comparison;

wherein the data sets further comprise hop counts of paths; and the comparing the at least one type of information in the data sets of the at least two time source signals, and determining the better time source signal based on the result of the comparison comprises:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable;

comparing the hop counts of paths in the data sets of the at least two time source signals in case that the path time accuracies are identical; and determining a time source signal having a less hop count of paths as the better time source signal.

14. The network device according to claim 13, wherein the comparing the at least one type of information in the data sets of the at least two time source signals, and determining the better time source signal based on the result of the comparison comprises:

comparing the grandmaster clock identifiers in the data sets of the at least two time source signals;

comparing the path time accuracies in the data sets of the at least two time source signals in case that the grandmaster clock identifiers are identical; and determining a time source signal having a less value of the path time accuracy as the better time source signal.

15. The network device according to claim 13, wherein the data sets further comprise hop counts of paths; and the comparing the at least one type of information in the data sets of the at least two time source signals, and determining the better time source signal based on the result of the comparison comprises:

comparing the grandmaster clock identifiers in the data sets of the at least two time source signals;

comparing the path time accuracies in the data sets of the at least two time source signals in case that the grandmaster clock identifiers are identical;

comparing the hop counts of paths in the data sets of the at least two time source signals in case that the path time accuracies are identical; and determining a time source signal having a less hop count of paths as the better time source signal.

16. The network device according to claim 13, wherein the comparing the at least one type of information in the data sets of the at least two time source signals, and determining the better time source signal based on the result of the comparison comprises:

comparing the grandmaster clock quality parameters in the data sets of the at least two time source signals; and determining a time source signal, which has a better clock quality characterized by the grandmaster clock quality parameter, and for which a grandmaster clock is usable, as the better time source signal.

17. The network device according to claim 13, wherein the comparing the at least one type of information in the data sets of the at least two time source signals, and determining the better time source signal based on the result of the comparison comprises:

comparing the grandmaster clock quality parameters in the data sets of the at least two time source signals;

comparing the path time accuracies in the data sets of the at least two time source signals in case that clock qualities characterized by the grandmaster clock quality parameters are identical and grandmaster clocks corresponding to the at least two time source signals are all usable; and determining a time source signal having a less value of the path time accuracy as the better time source signal.

18. The network device according to claim 13, wherein the obtaining the respective data sets of the at least two time source signals comprises:

receiving at least two synchronization messages by the network device, wherein each of the synchronization messages comprises information of one time source signal; and obtaining the data sets corresponding to the time source signals based on the information of the time source signals.

* * * * *